Jan. 7, 1947.　　　D. HEYER　　　2,413,763
GEARED PULLEY
Filed Feb. 20, 1943　　　3 Sheets-Sheet 1
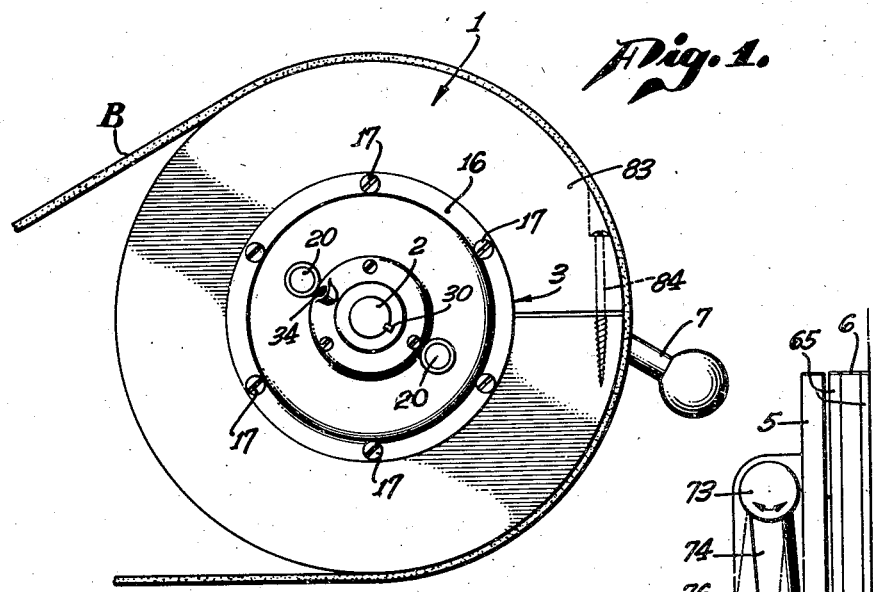
Fig. 1.
Fig. 3.
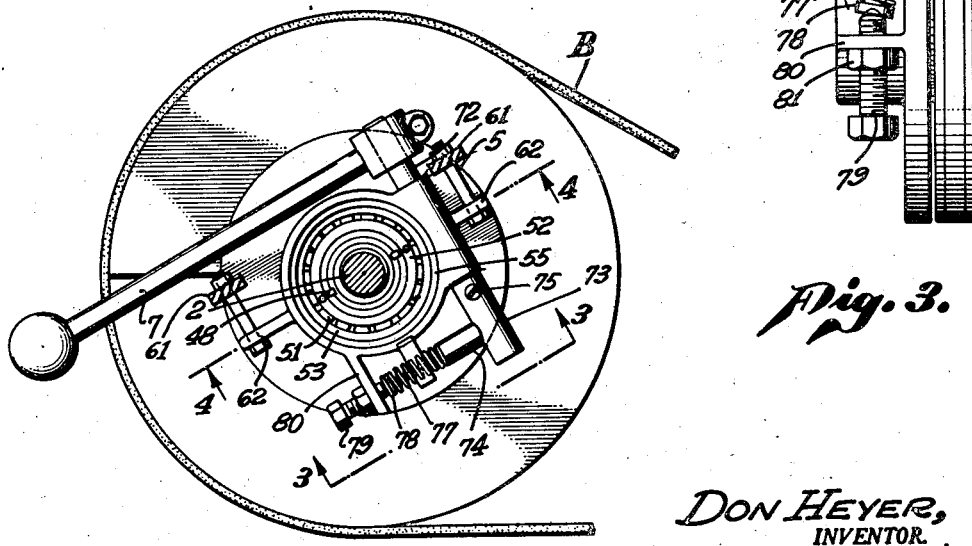
Fig. 2.
DON HEYER,
INVENTOR.
BY
ATTORNEY.

Jan. 7, 1947.  D. HEYER  2,413,763
GEARED PULLEY
Filed Feb. 20, 1943  3 Sheets-Sheet 2

DON HEYER,
INVENTOR.

BY
ATTORNEY.

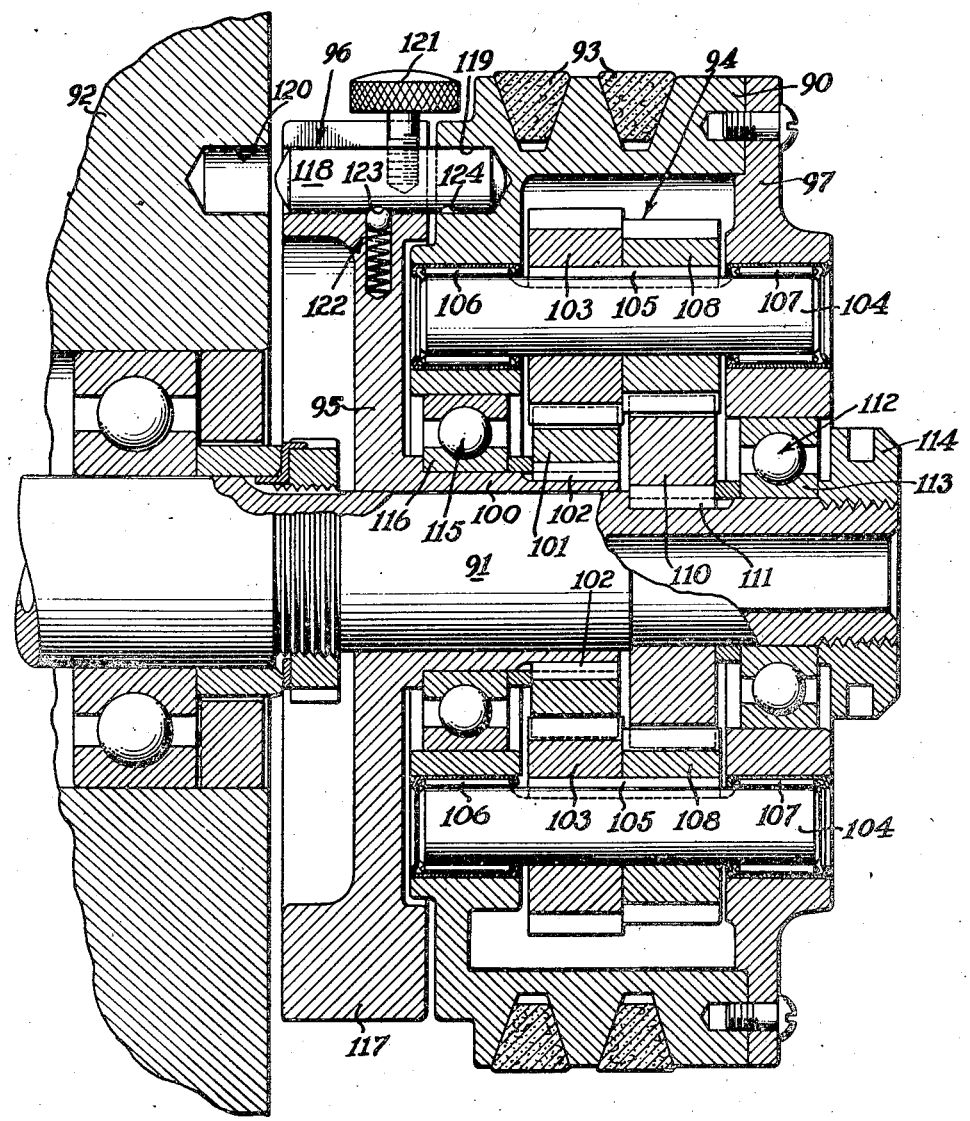

Patented Jan. 7, 1947

2,413,763

UNITED STATES PATENT OFFICE 2,413,763

GEARED PULLEY

Don Heyer, Los Angeles, Calif.

Application February 20, 1943, Serial No. 476,585

12 Claims. (Cl. 74—290)

This invention relates to speed change mechanism, and more particularly to a mechanism adapted to be incorporated in a pulley suitable for mounting as a unit on a shaft of the machine.

It is an object of this invention to provide a geared pulley structure for mounting on a shaft or the like and arranged to cooperate with a belt, chain or other mechanical element, rotary motion being transmitted between the shaft and the pulley structure at an altered speed, or optionally with no change in rate or direction.

It is another object of the invention to provide a speed change mechanism which may be installed readily in an existing machine without the need of substantial alterations in the machine.

It is another object of this invention to provide a speed change mechanism wherein either a direct drive or a drive at an altered speed may be readily obtained by actuation of a quick change means.

It is still another object of this invention to provide a speed change mechanism incorporated in a pulley which may be substituted for the usual pulley on a desired piece of equipment.

For example, a pulley incorporating the speed change mechanism may be mounted on the countershaft of a lathe, the pulley being connected by a belt with a suitable prime mover. By arranging the speed change mechanism to reduce the speed between the pulley and the shaft, it is possible to maintain a high belt speed and to obtain an increased torque and reduced speed on the driven shaft instantly by operating a quick change lever, and without the necessity of stopping the machine to shift belts or gearing therein.

Thus, for example, it is possible to operate a drill to bore a hole at a proper drilling speed, utilizing the speed change mechanism in its direct drive or high speed position. Then by shifting the quick change lever to low speed position, the speed is at once reduced to that proper for operating a tap to thread the hole. Upon the tap reaching the desired depth, the prime mover is reversed and the change speed mechanism returned to high speed position, thus rapidly removing the tap from the work. A similar procedure may be followed in exteriorly threading work, in reaming holes, and many other cases where it is desirable to change speed quickly. This results in a substantial increase in production.

To permit quick changes in the speed ratio to accomplish the foregoing, it is desirable that positive mechanical connections in the speed change mechanism be avoided, as otherwise damaging shocks to the machine or mechanism may occur.

It is thus another object of the invention to provide one form of speed change mechanism wherein the operating engagement of the parts causing a change in the speed ratio is by frictional engagement only.

It is a still further object of the invention to provide another form of the invention adapted for use where the speed ratio is seldom altered, wherein a positive engagement is provided between the parts controlling the speed ratio.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring now to the drawings:

Figure 1 is an end elevation of a pulley embodying the invention;

Figure 2 is an elevation of the opposite end of the pulley of Figure 1;

Figure 3 is a detail view as seen on line 3—3 of Figure 2;

Figure 6 is a detail section similar to Figure 4, but showing a modified form of the invention.

Figure 4:
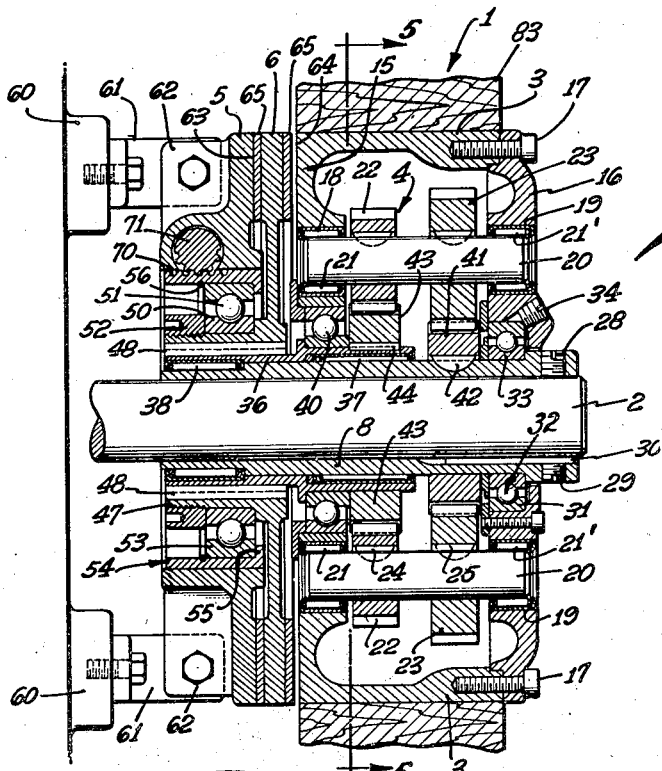
Figure 4 is a detail section as seen on line 4—4 of Figure 2.

Referring to Figures 1 and 2 of the drawings, the pulley generally indicated by 1 is shown as mounted on a shaft 2, and arranged for cooperation with a belt B. The pulley structure 1 includes a large hollow hub 3 forming a housing or case for supporting and enclosing a gear train 4 which operatively connects the pulley 1 with the shaft 2 (see Figures 4 and 5). A member 5 is rotatably supported on the shaft 2 adjacent the left side of the hub 3, and is maintained stationary in any convenient way as by being suitably attached to the machine carrying the shaft 2.

Slidably supported on the shaft 2 between the member 5 and the hub 3 is a friction clutch and brake element or coupling means 6. A hand lever 7 (Figure 2) is provided for axially shifting the clutch and brake element 6 so as to frictionally engage either a face of the stationary member 5 or of the hub 3. Means are provided to hold the lever 7 and hence the clutch and brake element 6 in adjusted position. The arrangement is such that when the coupling means or the clutch and brake element 6 is in engagement with the stationary member 5, motion is transmitted between the pulley 1 and the shaft 2 through the gear train 4, the relative directions and speeds depending on the characteristics of the gear train 4. When the coupling means 6 is in engagement with the hub 3, the pulley 1, means 6 and shaft 2 revolve as a unit. It will be understood that the drive is through the frictional engagement of the clutch and brake element 6 either with the member 5 or the hub 3, and hence shock or damage to the parts is avoided upon changing the speed ratio. The entire mechanism is assembled on a sleeve 8 and thus may be mounted as a unit on the shaft 2.

Figure 5:
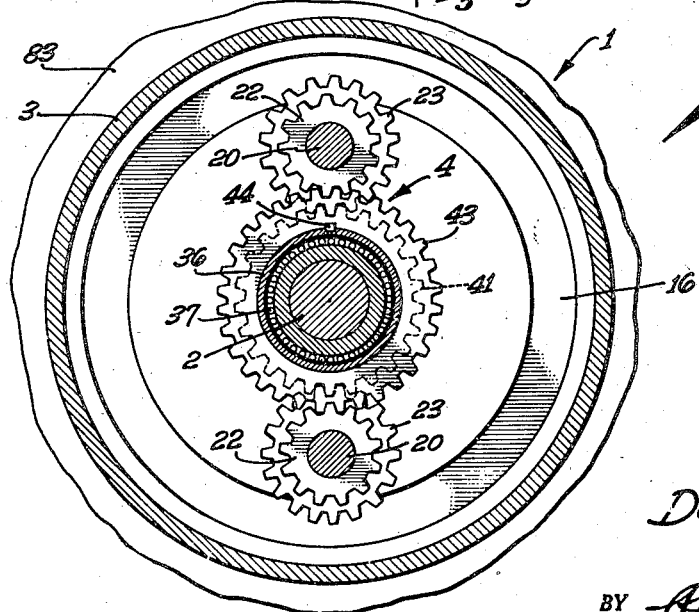
Figure 5 is a section as seen on line 5—5 of Figure 4.

The hub 3, as clearly shown in Figure 4, comprises a hollow cylinder provided at one end with an integral wall 15 and at the opposite end with a detachable cover 16, held in place as by screws 17. The wall 15 and the cover 16 are provided with a plurality of diametrically opposite aligned apertures 18 and 19, containing anti-friction bearings 21 and 21', which cooperate respectively to rotatably support the shafts 20. Each shaft 20 carries spur gears 22 and 23 suitably secured thereon as by keys 24 and 25.

The sleeve 8 is secured on the shaft 2 against angular or axial movement thereon by the set screws 28, 29 and the key 30. As previously mentioned, the pulley 1 is carried on the sleeve 8. Thus, the outer race 31 of an anti-friction bearing 32 is secured in a suitable recess in the cover 16, the inner race 33 being secured on the sleeve 8 adjacent one end thereof. A plug 34 may be provided to permit lubricant to be applied to the bearing 32. A control member in the form of an outer sleeve or bushing 36 is rotatably supported on the sleeve 8, as by anti-friction bearings 37 and 38. The wall 15 of the cage 3 is rotatably supported on the bushing 36 as by a suitable anti-friction bearing 40.

A spur gear 41, secured on the sleeve 8 as by a key 42, meshes with the gears 23. Another spur gear 43, similarly secured on the bushing or control member 36 by a key 44, meshes with the gears 22. The described gearing cooperates to form a differential gear train 4 comprising the pair of gears 22, 23, the driving gear 41, and the sun or control gear 43. It will be clear that rotation of the pulley 1 with respect to the shaft 2 will cause the shafts 20 to revolve about the shaft 2. Since these shafts 20 are free to rotate about their own axes and carry the gears 22, 23, respectively meshing with the gears 43 and 41, the rotation of pulley 1 will be imparted to the sleeve 8 and hence shaft 2, and also to the control member or bushing 36. The relative speeds and directions of rotation of the shaft 2 and the bushing 36, in accordance with known principles, will depend on the relative sizes of the gears 22, 23, 41 and 43, as well as on the loading or other restraint applied to the shaft 2 and bushing 36. For example, if the shaft 2 is the load driving shaft, the speed of this shaft is altered by controlling the speed of the control gear 43. Such control may take the form of applying either a force restraining the rotation of the gear, or a force urging it to rotate. One means for doing this will now be described.

The clutch and brake element or coupling means 6 has an integral hub 47 by which it is supported on the bushing 36 for axial movement thereof, the hub 47 being splined on the bushing 36 by keys 48. The inner race 50 of an anti-friction thrust bearing 51 is secured on the hub 47 by a large nut 52. The outer race 53 of the bearing 51 is secured in a bearing cage 54, being confined between an integral lip 55 on the cage 54 and a snap ring 56. The stationary member or control housing 5 is slidably supported on the exterior of the cage 54. This housing is restrained against axial or angular movement with respect to the shaft 2, pulley 1, etc., as previously mentioned, by being secured to the frame of the machine supporting shaft 2. This may be done conveniently by brackets 61 which are bolted to lugs 62 formed on the housing 5, and are also attached to a convenient part of the machine indicated by 60.

Movement of the cage 54 axially of the bushing 8 in the control housing 5, serves to frictionally couple the clutch and brake element or coupling means 6 with either face 63 of the housing 5, or face 64 of the gear case 3. To prevent undue wear of the contacting surfaces the opposite faces of the disc 6 are shown as provided with suitable facing 65. Means are provided for optionally urging the coupling means 6 into engagement with either the face 63 or the face 64 with sufficient force to prevent relative movement between the disc and the selected face.

With the clutch and brake element 6 held stationary by engagement with the friction face 63 of the control housing 5, the control member 36 and the control gear 43 are also held against rotation. Rotation of the pulley structure 1 and gear case 3 will then cause the gears 22 to revolve about the gear 43, as well as rotate about their axes. This motion of the gears 22 is imparted to their supporting shafts 20 and the gears 23 which in turn drive the gear 41, and with it the sleeve 8 and the shaft 2, the speed of shaft 2 with respect to the pulley 1 depending on the characteristics of the gear train 4. If, however, the clutch and brake element 6 is held against the friction face 64 of the gear case 3 so as to prevent slippage therebetween, the gear 43 will rotate at the same speed as the shafts 20 revolve around it. Thus, the shafts 20, and the gears 22 do not have any rotary motion about their axes, and the entire assembly revolves as a unit, the shaft 2 rotating at the same speed as the pulley 1.

As a convenient means for shifting the element 6, a rack 70 is formed on a portion of the outside of the sleeve 54. This rack 70 is engaged by a pinion 71 formed on a shaft 72 which is rotatably supported in the housing 5. The hand lever 7 is secured to the shaft 72 adjacent one end thereof. Angular movement of the shaft 72, imparted by swinging the hand lever, obviously will shift the cage 54 and the element 6 axially along the shaft 2.

Means are provided for maintaining the element 6 in adjusted position (see Figures 2 and 3). Thus, a sleeve 73, having a lever 74 formed thereon, is fixed on the shaft 72, as by a set screw 75. The lever 74 has a shoulder 76 engaged by one end of a spring 77. The opposite end of the spring 77 is supported by a collar 78, which pivotally engages an adjusting screw 79. The adjusting screw 79 is threadedly supported in a lug 80 formed on the housing 5. A lock nut 81 serves to secure the screw 79 in adjusted position.

The arrangement is such that the spring 77 is compressed at all times between the shoulder 76 and the collar 78, this compression being a maximum when the lever 74 is in a position to place the clutch and brake element 6 intermediate the friction faces 63 and 64. Thus, the spring 77 acts as a toggle or over center spring to resiliently urge and maintain the lever 74 either one way or the other from said intermediate position in accordance with the movement of the hand lever 7. The force exerted by the spring 77 must be sufficient to maintain the element 6 against the chosen friction face 63 or 64 with sufficient pressure to prevent relative slippage.

As a convenient way of providing different diameters of the pulley 1, the pulley surface is shown as formed on an adapter 83 clamped about the exterior of the gear case 3 as by a clamping screw 84. Obviously, the adapter 83 can readily be removed and replaced by one of a different size, or by providing a suitable surface on the exterior of the gear case 3. If desired, the belt B may be run directly on the gear case.

The operation of the device will be apparent from the foregoing. With the hand lever 7 in position to bring the element 6 against the gear case 3, high speed or direct drive between the shaft 2 and the pulley 1 occurs. When an altered speed is desired, the hand lever 7 is merely shifted to bring the element 6 into engagement with the control housing 5, when motion between the shaft 2 and the pulley 1 will be transmitted through the gear train 4. Direct drive may be resumed whenever desired by returning the hand lever 7 to again bring the element 6 against the gear case 3.

In the form of the invention illustrated in Figure 6, a cylindrical member 90 is shown, which has a detachable cover 97 and forms a casing or housing similar to that in the first described form of the invention. The casing 90 is rotatably mounted on the shaft 91 of a machine, a portion of the frame of which is indicated by 92. The periphery of the casing 90 is suitably grooved to receive a plurality of belts 93 which are thus in operative relationship with the shaft 91. The casing 90 is operatively connected with the shaft 91 through a gear train 94, the restraint placed on a control member 95 serving to determine whether the housing 90 and the shaft 91 are connected through the gear train 94 to rotate at different angular velocities or to rotate as a unit. However, in this form of the invention coupling means 96 serves either to positively couple the control member 95 to the frame 92, thus holding the member stationary, or to positively couple the member 95 to the housing 90 so as to rotate therewith.

The control member 95 is mounted on the shaft 91 between the housing 90 and the frame 92 and has a hub or bushing 100 which projects within the housing. A gear 101, forming one member of the gear train 94, is fixed on the hub 100 by keys 102. Meshing with the gear 101, which may conveniently be termed the control gear, are pinions 103 secured on shafts 104 as by long keys 105, the shafts 104 being rotatably carried by suitable anti-friction bearings 106 and 107 mounted respectively in the casing 90 and in the cover 97. The shafts 104 also carry pinions 108 fixed thereon by the key 105, pinions 108 meshing with the driving gear 110, fixed on the shaft 91 as by the key 111.

The housing 90 is supported for rotation with respect to the shaft 91, as by an anti-friction bearing 112, the inner race 113 of which is secured on the shaft 91 as by a nut 114, and by an anti-friction bearing 115, the inner race 116 of which is suitably secured on the hub 100 of the control member 95. The control member 95 is provided with a rim 117 which carries the coupling means 96. This means comprises a pin 118 arranged for axial movement with respect to the rim 117 in a direction parallel with the shaft 91. The housing 90 is provided with an opening 119 for accommodating the pin 118 at one extremity of its movement, and a similar opening 120 is provided in some convenient stationary part as the frame 92 for accommodating the pin 118 at the other extremity of its movement. A finger grip 121 is provided for convenient manipulation of the pin 118, and a spring pressed detent 122, adapted to engage either notch 123 or 124 in the pin 118, serves to maintain the pin in adjusted position.

This form of the invention operates in a substantially identical manner with the first described form. That is, when the control member 95 is prevented from rotating, as by being coupled to the frame 92 by the coupling means 96, motion is transmitted between the shaft 91 and the housing 90 through the gear train 94, causing a difference in the speeds of the shaft 91 and the housing 90. When the control member 95 is arranged to rotate with the housing 90, as by being coupled thereto by the means 96, motion is transmitted between the housing 90 and the shaft 91 at no change in speed.

It is of course necessary to bring the structure substantially to a standstill before changing from one speed to the other, since it is obviously impossible to shift the pin 118 with the parts moving with any material velocity. However, in this form the positive driving connection furnished by the coupling means 96 is substituted for the frictional driving connection formed by the coupling element 6 of the first form, which is an advantage when the machine is to be operated for long periods at the same speed ratio, or when the pulley is to be used solely as a geared pulley.

I claim:

1. In a speed change mechanism, a driving member and a load driving member, a gear train including a control gear, adapted to operatively connect said members, a stationary member adjacent one of the driving members, and a clutch element for controlling the rotation of the control gear and supported on said one driving member between the driving member and the stationary member, said clutch element being movable optionally into engagement with either the said driving member or the stationary member for controlling rotation of the said gear, and means for moving said clutch element comprising a pivoted lever arm, means forming a connection between said lever arm and said clutch element, a fixed abutment, and means aligned with said arm when the clutch member is in an intermediate position, said means being confined between said arm and said abutment and adapted to resiliently urge the lever in either direction from said intermediate position.

2. In a speed change mechanism, a clutch control housing, a rotatable clutch element, a cage supported in said housing coaxially of said element, means for transferring thrust between the cage and said element, said means also rotatably supporting said element in the cage, and means for axially moving said cage, comprising a pivoted lever and means including rack and pinion mechanism, for translating angular movement of the lever to axial movement of the cage.

3. In a geared pulley for use with a rotatable shaft, a gear case having means forming a pulley face thereon, means rotatably supporting said case on said shaft, a control member supported for rotation on the shaft, gearing operatively connecting the case with the shaft and including a gear fixed with respect to the shaft as well as a control gear fixed on said control member, means for controlling the rotation of said control member and said gear, comprising a stationary member adjacent the gear case, said member and said gear case having opposed axially spaced friction faces, a clutch and brake element splined on said control member for axial movement thereon, and means for optionally urging said element axially in one direction of the control member into engagement with the stationary member, or axially of the control member in the other direction into engagement with the gear case.

4. In a geared pulley adapted for use with a rotatable shaft, a gear case having means forming a pulley face thereon, means for rotatably supporting said case on the shaft, including a bushing supported for rotation on the shaft, gearing operatively connecting the case with the shaft and including a control gear fixed on the bushing, means for controlling rotation of said bushing and said gear, comprising a stationary member, a member carried by the bushing and extending radially outward therefrom, and coupling means carried by said last mentioned member adjacent the periphery thereof for optionally engaging the gear case or the stationary member upon movement in an axial direction with respect to the shaft.

5. In a geared pulley for use with a rotatable shaft, a sleeve adapted to be secured on said shaft, a gear case having means forming a pulley surface as well as a friction face thereon and rotatably mounted on said sleeve, a gear train including a control gear operatively connecting said gear case with said sleeve, a member adapted to be anchored against rotation rotatably mounted on said sleeve, said member having a friction face, and coupling means rotatably mounted on said sleeve and movable optionally into engagement with either friction face for controlling rotation of the control gear.

6. In a speed change mechanism, a pulley, a sleeve rotatably supporting the pulley and adapted to be fixed on a rotatable shaft, gearing adapted to operatively connect said pulley and said sleeve, coupling means rotatably supported on said sleeve and optionally movable between limits, and a member rotatably carried by said sleeve and adapted to be anchored against rotation, said coupling means at one extremity of its movement serving to engage said member to render said gearing effective and at the other extremity serving to directly couple the pulley with the shaft.

7. In a geared pulley for use with a machine having a rotatable shaft with a free end extension projecting from the machine, a gear case having means forming a pulley face thereon, means rotatably supporting said case on said shaft extension, a control member supported for rotation with respect to the shaft extension and extending out of the gear case toward the machine, gearing operatively connecting the case with the shaft and including a gear fixed with respect to the shaft as well as a control gear fixed on said control member, means for controlling the rotation of said control member and said gear, comprising means forming a stationary member adjacent that side of said case away from the end of said shaft extension, and means between the means forming the stationary member and said gear case for optionally operatively coupling said control member with the stationary member forming means or the gear case.

8. In a geared pulley for use with a machine having a rotatable shaft with a free end extension projecting from the machine, a gear case having means forming a pulley face thereon, means rotatably supporting said case on said shaft extension, a control member supported for rotation with respect to the shaft extension and extending out of the gear case toward the machine, gearing operatively connecting the case with the shaft and including a gear fixed with respect to the shaft as well as a control gear fixed on said control member, means for controlling the rotation of said control member and said gear, comprising means forming a stationary member adjacent that side of said case away from the end of said shaft extension, an element carried by said control member between the means forming the stationary member and said gear case, and extending radially outward therefrom, and coupling means carried by said element adjacent the outer edge thereof for optionally engaging the gear case or the stationary member forming means upon movement in an axial direction with respect to the shaft.

9. In a geared pulley for use with a machine having a rotatable shaft with a free end extension projecting from the machine, a gear case having means forming a pulley face thereon, means rotatably supporting said case on said shaft extension, a control member supported for rotation with respect to the shaft extension and extending out of the gear case toward the machine, gearing operatively connecting the case with the shaft and including a gear fixed with respect to the shaft as well as a control gear fixed on said control member, means for controlling the rotation of said control member and said gear, comprising means forming a stationary member adjacent that side of said case away from the end of said shaft extension, and a clutch and brake element splined on said control member for axial movement with respect thereto, and between the means forming the stationary member and said gear case, for optionally operatively coupling said control member with the stationary member forming means or the gear case.

10. In a geared pulley for use with a machine having a rotatable shaft with a free end extension projecting from the machine, a gear case having means forming a pulley face thereon, means rotatably supporting said case on said shaft extension, a control member supported for rotation with respect to the shaft extension and extending out of the gear case toward the machine, gearing operatively connecting the case with the shaft and including a gear fixed with respect to the shaft as well as a control gear fixed on said control member, means for controlling the rotation of said control member and said gear, comprising means forming a stationary member adjacent that side of said case away from the end of said shaft extension, and an element secured on said control member spaced from the axis of the shaft and between the means forming the stationary member and said gear case, said element being axially movable with respect to said control member for optionally operatively coupling said control member with the stationary member forming means or the gear case.

11. In a geared pulley for use with a machine having a rotatable shaft with a free end extension projecting from the machine, a gear case having means forming a pulley face thereon, gearing operatively connecting the case and said shaft and including a control member mounted for rotation with respect to the shaft extension and extending out of the gear case toward the machine, and a gear fixed with respect to the shaft as well as a control gear fixed on said control member, means for controlling the rotation of said member and said gear comprising an element axially movable on said control member, and bearing means on opposite sides of the gear case respectively supported with respect to said shaft and on said control member mutually cooperating to support said case for rotation about the axis of said shaft.

12. In a geared pulley for use with a machine having a rotatable shaft with a free end extension projecting from the machine, a gear case having means forming a pulley face thereon, means rotatably supporting said case on said shaft extension, a control member supported for rotation with respect to the shaft extension and extending out of the gear case toward the machine, gearing operatively connecting the case with the shaft and including a gear fixed with respect to the shaft as well as a control gear fixed on said control member, means for controlling the rotation of said control member and said gear, comprising means forming a stationary member adjacent that side of said case away from the end of said shaft extension, means between the means forming the stationary member and said gear case for optionally operatively coupling said control member with the stationary member forming means or the gear case, and a detachable cover on that side of the gear case adjacent the free end of the shaft.

DON HEYER.